June 18, 1968     G. A. TINNERMAN     3,388,627
COMPOSITE FASTENER ASSEMBLY
Original Filed March 13, 1966

INVENTOR
GEORGE A. TINNERMAN

BY Arthur H. Van Horn

ATTORNEY

United States Patent Office 3,388,627
Patented June 18, 1968

3,388,627
COMPOSITE FASTENER ASSEMBLY
George A. Tinnerman, 17864 Beach Road,
Lakewood, Ohio 44107
Original application May 13, 1966, Ser. No. 549,880.
Divided and this application Jan. 5, 1967, Ser. No. 607,415
2 Claims. (Cl. 85—32)

ABSTRACT OF THE DISCLOSURE

A composite fastener assembly of separately formed, synthetic resinous plastic and metallic components, the metal element being inserted within the plastic body, the elements having an opening therethrough for a stud on which the fastener may be threaded.

Copending application

This application is a division of Ser. No. 549,880, filed May 13, 1966, for Composite Fastener.

Summary of invention

Plastic nuts and sheet metal nuts are known. The plastic nuts are less susceptible to vibration than metal and may also seal the opening, but have low strength because the plastic material is relatively weak. Sheet metal nuts are inexpensive and easily applied, but can only be used on light work because of low strength and possible deformation.

Applicant has found that when a sheet metal nut is incorporated in a plastic body and then threaded on a threaded member, the composite fastener has substantially greater strength than its components. This increase in strength results from the resistance offered to distortion of the metal member when associated with the plastic body and the compressive force exerted on the plastic body by the metal element.

In one form, as embodied in this application, the plastic body and the metal nut element are formed separately and the nut element is then inserted in a cavity in the plastic body. The two then cooperate when engaged by a member threaded into the fastener.

Drawings

Figure 1:
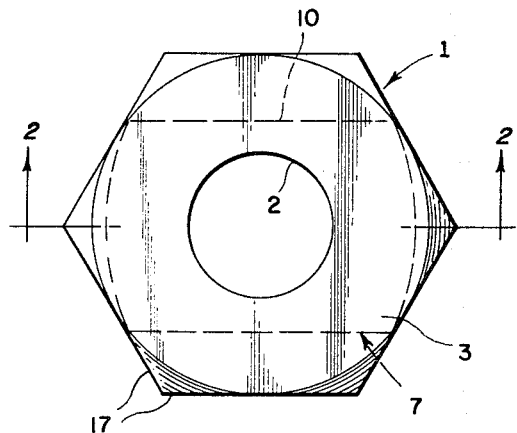
Figure 2:
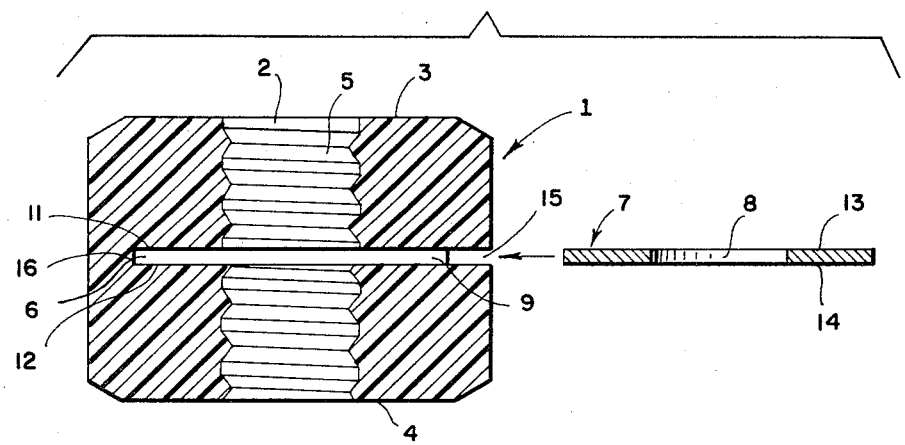

FIGURE 1 is a view of the assembled fastener.
FIGURE 2 is a view of the components before assembly, indicating how the metal element is inserted in a cavity in the plastic body.

Description

The plastic body 1 is provided with an aperture therethrough shown at 2 between the end faces 3, 4, and this aperture may be threaded as at 5. The threads at 5 may be of less depth than normal threads, as shown in the drawings, the peak diameter and pitch being normal but the depth of the threads is less than the threads on the engaging member. When this member is threaded into the plastic body, it cuts or distorts the root portions of the threads, resulting in a tight, secure engagement.

A cavity 6 is formed in the plastic body between the end faces 3, 4 and intersecting the aperture 2. This cavity is of a shape and size to receive the flat metal nut element 7, which has an aperture 8. When metal element 7 is positioned in the cavity 6, the aperture 8 is axially aligned with the aperture 2 in the plastic body.

As shown in FIGURE 1, the cavity is of less width than the plastic body to leave the sides 9 to be engaged by side edges 10 of the metal element. The upper and lower surfaces 11, 12 of the cavity closely contact the top and bottom surfaces 13, 14, respectively, of the metal element.

In the construction shown in this case, the cavity 6 in the plastic element is open at one side at 15 to receive the metal element, but is closed at the opposite side at 16.

The plastic body and metal nut element may be formed in any desired manner before assembly as shown in FIGURE 2. When the metal nut element is inserted in the cavity, its close engagement with the surfaces of the cavity results in a composite fastener which functions as a unit, the plastic body preventing distortion of the metal element, and the metal element exerting compressive force on the plastic body.

As shown at 17, the plastic body has flat surfaces to form a wrench seat and the engagement of the sides 9 of the cavity with the side edges 10 of the metal element rotates the latter on the threaded stud.

While in this specific form of the invention as illustrated, the sheet metal element 7 is designed to engage the threads on a stud, in cooperation with the partially formed threads 5 in the plastic body, it will be readily apparent that the metal element may be of different shapes, some of which are illustrated in the original application Ser. No. 549,880. It is also contemplated that various types of so-called thread-cutting nuts, which are designed to cut a spiral groove in a plain stud, may be used in the plastic body, in which case the threads in the plastic body would not be necessary.

I claim:

1. A composite fastener comprising a nut body of essentially rigid synthetic resinous plastic material having an opening therein for threaded engagement with a threaded member to constitute a threaded fastening means and having opposite end faces transverse to the axis of said opening and a slot transverse to said opening intermediate said end faces of less width than said nut body to leave portions of said body along the sides of said slot, said slot extending into said body past said opening, and a thin sheet metal nut element formed separately and inserted in said slot with its opposite faces in close contact with opposite sides of said slot, said metal element having an opening axially aligned with the opening in said nut body when in said body, said portions of said nut body engaging the edges of said metal element to prevent relative rotation, said plastic nut body in contact with the faces of said sheet metal nut element limiting distortion of said sheet metal nut element to maintain said sheet metal nut element in engagement with the threads of said threaded member and said metal nut element exerting compressive force on said plastic nut body to increase the engagement between said plastic nut body and the threads of the threaded member, so as to increase the resistance of said fastener to the torque produced on relative rotation to tighten said fastener on the threaded member.

2. A composite fastener comprising upper and lower portions of essentially rigid synthetic resinous plastic material forming a nut body, said portions of said nut body being formed with a stud-engaging opening and with a cavity closed on at least two opposite sides molded therein transverse to said opening between the lower and upper surfaces of said upper and lower portions, respectively, and spaced from the end faces of said nut body, a separately formed sheet metal nut element inserted in said cavity with top and bottom surfaces in contact with said lower and upper surfaces, respectively, of said nut body, said nut element having a stud-engaging opening axially aligned with the opening in said nut body, said nut element having edges non-concentric with the axis of said opening engaging said nut body at the sides of said cavity to prevent relative rotation.

References Cited

UNITED STATES PATENTS

| | | | |
|---|---|---|---|
| 1,035,118 | 8/1912 | Goldsman | 151—15 |
| 2,072,426 | 3/1937 | Kraft | 85—32 |
| 2,389,634 | 11/1945 | Park | 151—15 |
| 2,410,995 | 11/1946 | Olson | 151—15 |
| 2,417,263 | 3/1947 | Morehouse | 85—36 |
| 2,624,386 | 1/1953 | Russell | 85—32 |
| 3,286,578 | 11/1966 | Fiddler | 151—7 |

MARION PARSONS, Jr., *Primary Examiner.*